United States Patent
Vermeulen

(10) Patent No.: US 9,628,186 B2
(45) Date of Patent: Apr. 18, 2017

(54) ADVANCED OPTICAL MODULATION GENERATION BY COMBINING ORTHOGONAL POLARIZED OPTICAL SIGNALS

(71) Applicant: ACACIA COMMUNICATIONS INC., Maynard, MA (US)

(72) Inventor: Diedrik Vermeulen, Maynard, MA (US)

(73) Assignee: Acacia Communications, Inc., Maynard, MA (US)

(*) Notice: Subject to any disclaimer, the term of this patent is extended or adjusted under 35 U.S.C. 154(b) by 33 days.

(21) Appl. No.: 14/538,781

(22) Filed: Nov. 11, 2014

(65) Prior Publication Data
US 2015/0132013 A1     May 14, 2015

Related U.S. Application Data

(60) Provisional application No. 61/902,566, filed on Nov. 11, 2013.

(51) Int. Cl.
    *H04B 10/50*     (2013.01)
    *H04B 10/54*     (2013.01)
    *H04B 10/556*     (2013.01)

(52) U.S. Cl.
CPC ....... *H04B 10/5053* (2013.01); *H04B 10/541* (2013.01); *H04B 10/5561* (2013.01)

(58) Field of Classification Search
None
See application file for complete search history.

(56) References Cited

U.S. PATENT DOCUMENTS

2014/0153075 A1*   6/2014   Malacarne ........... H04B 10/541
                                                   359/238

* cited by examiner

*Primary Examiner* — Darren E Wolf
(74) *Attorney, Agent, or Firm* — Wolf, Greenfield & Sacks, P.C.

(57) ABSTRACT

Disclosed are adaptive structures and methods for generating advanced modulation formats using multiple levels such as PAM-4, PAM-8 as well as regular OOK or PM OOK formats. Structures and methods disclosed include an unequal power splitter that may exhibit a fixed or tunable splitting ratio such that adaptive format(s) may be generated.

3 Claims, 4 Drawing Sheets

ADVANCED OPTICAL MODULATION GENERATION BY COMBINING ORTHOGONAL POLARIZED OPTICAL SIGNALS

CROSS REFERENCE TO RELATED APPLICATIONS

This application claims the benefit of U.S. Provisional Patent Application Ser. No. 61/902,566 filed Nov. 11, 2013 which is incorporated by reference in its entirety as if set forth at length herein.

TECHNICAL FIELD

This disclosure relates generally to optical communications structures systems and methods. More particularly, this disclosure pertains to techniques, methods and apparatus for generating modulation formats by techniques that combine orthogonal polarized optical signals.

BACKGROUND

Contemporary optical communications systems oftentimes employ advanced modulation formats. Given their importance to these contemporary optical communications systems, techniques, methods and apparatus that facilitate the generation of such modulation formats would represent a welcome addition to the art.

SUMMARY

An advance in the art is made according to an aspect of the present disclosure directed to the generation of advanced modulation formats by techniques, methods and apparatus that combine orthogonal polarized optical signals.

Accordingly, one aspect of the present disclosure is directed to a method and structures for generating advanced modulation formats using multiple levels such as PAM-4, PAM-8 as well as regular OOK or PM OOK formats. Structures and methods disclosed include an unequal power splitter that may exhibit a fixed or tunable splitting ratio such that adaptive format(s) may be generated. Structures disclosed include an Mach Zehnder (MZI) optical modulator comprising: a tunable splitter for splitting input light into two modulator arms of the MZI; a polarization combiner for combining light from the two arms into output light; wherein one of the MZI modulator arms includes an on-off-keying modulator (OOK), the other MZI modulator arm includes an OOK modulator followed by a polarization rotator; wherein the tunable splitter is configured such that one portion of the input light is directed into the one MZI modulator arm having the OOK modulator and another portion of the input light is directed into the other MZI modulator arm having the OOK modulator followed by the polarization rotator; such that output light exhibits a modulation format selected from the group consisting of PAM-4, PM-OOK, and OOK.

BRIEF DESCRIPTION OF THE DRAWING

A more complete understanding of the present disclosure may be realized by reference to the accompanying drawing in which.

DETAILED DESCRIPTION

Figure 1:
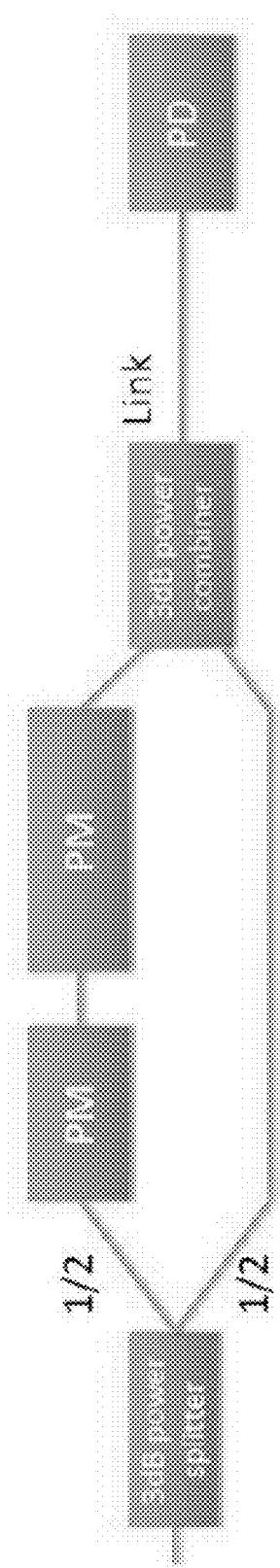
FIG. 1 shows a schematic of an illustrative multi-segmented Mach-Zehnder Interferometer (MZI)

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by noting that advanced modulation formats are particularly attractive for application to optical communications systems that require a high spectral efficiency (bit/s/Hz). As may be appreciated by those skilled in the art, high spectral efficiencies are traditionally required in metro, long-haul, and submarine optical communications systems where optical link cost(s) are very high and increasing spectral efficiency is seen as an effective way of reducing cost per bit. Such high optical link costs drive the use of multiple, high-performance, state-of-the-art components in transceivers used in such links.

As will be appreciated by those skilled in the art, datacenter communications systems and applications are very cost sensitive. With respect to such systems and applications utilizing short distance optical links (on the order of 100 m) multi-mode-fiber (MMF) ribbon cables in combination with directly modulated vertical-cavity surface-emitting lasers (VCSELs) are oftentimes employed. As is known however, for higher bitrates (i.e., greater than 10 Gb/S) VCSEL technologies are oftentimes challenged. Furthermore, as datacenters increase in geographic size, optical links of 2 km or more are oftentimes required. Such long optical link distances are generally not achievable with MMF instead, relying on single-mode fiber (SMF) technologies.

As may be further appreciated by those skilled in the art, optical integration is one enabling technology for low-cost, highly spectral efficient optical links. This technology is advantageously scalable, and enables use of high-performance electro-optical components and low-cost integration with electronics. Multi-wavelength technologies allow the increase of per-fiber bandwidth however they typically require multiple lasers which are known to be a most crucial component of systems employing same with respect to cost, yield and reliability.

For data communications transceivers, intensity modulation formats such as 4/8 level pulse amplitude modulation (PAM-4/PAM-8) are attractive alternatives to increase spectral efficiency as compared to phase modulation schemes. As is known, such PAM schemes only require a single photo-detector in a receiver, thereby reducing optical loss, cost and complexity of receivers.

One approach directed to producing multilevel modulated light employs a single multilevel modulator. An example of such an approach uses an electro-absorption modulator driven by a highly linear driver amplifier (LDA) preceded by a level encoder (LE) and a digital to analog converter (DAC). Such an approach enables digital linearization of the modulator transfer function and multilevel coding with non-equal level spacing for optimum signal-to-noise performance. Unfortunately, the LDA, LE and DAC consume a large amount of power—i.e. ~1.25 W.

Another approach to producing multilevel modulated light employs a multi-segmented Mach-Zehnder Interferometer (MZI) such as that shown schematically in FIG. 1. As depicted therein, an external modulator includes a MZI where at least one arm includes a number of phase modulator section(s). More specifically, the MZI is shown as including a 3 dB splitter and a 3 dB combiner interconnected via two "arms" of the MZI. Within one of the arms are positioned the number of phase modulator sections. For polarization amplitude modulation with N amplitude levels (PAM-N) modulation, the phase modulator will have M sections with N=2M. Each section will have a length of 2(m−1) times the shortest PM section and the total phase modulation of all PM section combined is approximately pi.

As may be appreciated, the approach depicted in FIG. 1 exhibits a number of advantages as compared to the single multilevel modulator approach. It allows for non-linear modulator drivers and accepts the direct non-return-to-zero encoding. Consequently, no DAC, LE or LDA is required. Only limiting amplifiers (LA) are required which advantageously exhibit a lower power requirement than a linear one(s).

As noted previously, one aspect of the present disclosure is directed to methods, structures, and systems that generate advanced modulation formats using multiple levels such as PAM-4, PAM-8 . . . etc. Moreover, the methods, structures and systems are advantageously adaptive such that they may generate on-off-keying (OOK) or polarization multiplexed (PM) OOK and be used—for example—to reduce a bitrate in an impaired link.

Figure 2:
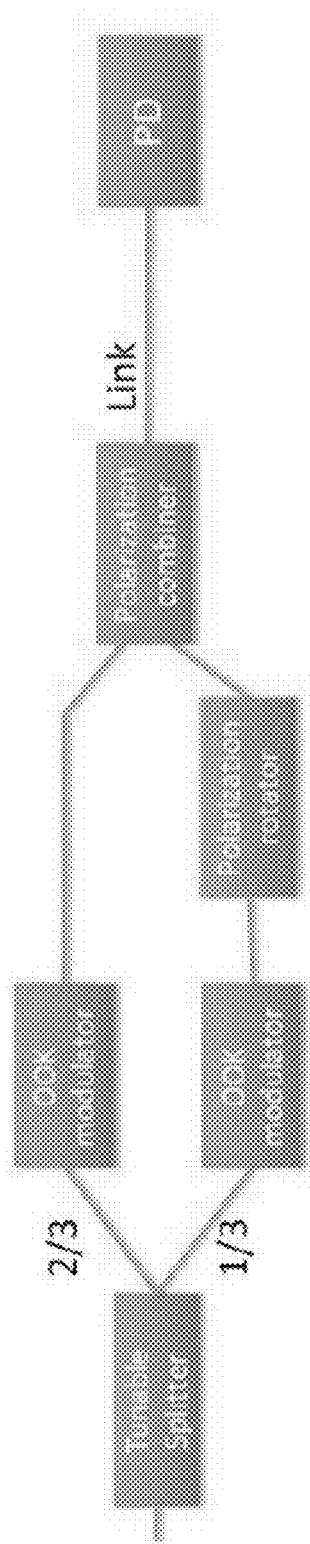
FIG. 2 shows a schematic of an illustrative structure for generating modulation formats such as PAM-4 according to an aspect of the present disclosure.

Turning now to FIG. 2, there is shown in schematic form an illustrative structure for generating modulation formats such as PAM-4 (among others) according to an aspect of the present disclosure. As may be observed from FIG. 2, the structure shown therein includes a Mach-Zehnder interferometer structure having a tunable splitter at its input and a polarization combiner at its output. Shown further in FIG. 2 are an OOK modulator in one arm of the MZI, and an OOK modulator and polarization rotator in the other arm of the MZI.

As may be appreciated by those skilled in the art, a generalized structure according to the present disclosure includes an optical power splitter at input to the MZI which splits input optical power unequally. This splitter may advantageously exhibit a fixed or tunable splitting ration. As may be readily understood by those skilled in the art, when the splitter is tunable the modulation format produced is adaptive. As may be further understood by those skilled in the art, one convenient implementation of such a tunable splitter comprises an MZI having a tunable phase shifter in one arm.

With continued reference to FIG. 2, it may be observed that the particular illustrative embodiment shown therein includes a tunable splitter that splits ⅓ of input optical power to the lower MZI arm and ⅔ of input optical power to the upper arm. Both arms are illustratively shown with on-off keying (OOK) modulators disposed therein which may advantageously be implemented via any of a variety of structures included electro-absorption modulator (EAM), ring modulator, . . . etc. Light traversing one of the arms (the lower arm in the illustrative example of FIG. 2) is rotated by the effect of a polarization rotator and then combined with light from the other arm by a output polarization combiner. As depicted in FIG. 2, the modulator scheme shown therein generates PAM-4 modulation. If however, the splitting ration is tuned to 50/50, then it will generate PM-OOK. Finally, if the splitting ratio is tuned to 100/0, then it will generate regular OOK.

As may be appreciated by those skilled in the art, advantages of the structure (optical circuit) shown schematically in FIG. 2 are numerous including that it works with regular non-return to zero (NRZ) signals, limiting amplifiers and without digital to analog conversion (DAC). As such, overall cost, complexity and power consumption are reduced. Furthermore, the modulator is adaptive and may readily be switched to produce other formats in addition to PAM-4 including OOK or PM-OOK. Still further, and in sharp contrast to the segmented scheme shown in FIG. 1 that works only with MZI modulator(s), schemes and structures according to the present disclosure operate with any modulator that generates OOK signals such as an EAM or ring modulator. Even if an OOK modulator is an MZI structure, schemes according to the present disclosure provide several benefits including the ability to use a larger swing of the inner MZI modulators and reduced inter symbol interference (ISI).

Figure 3:
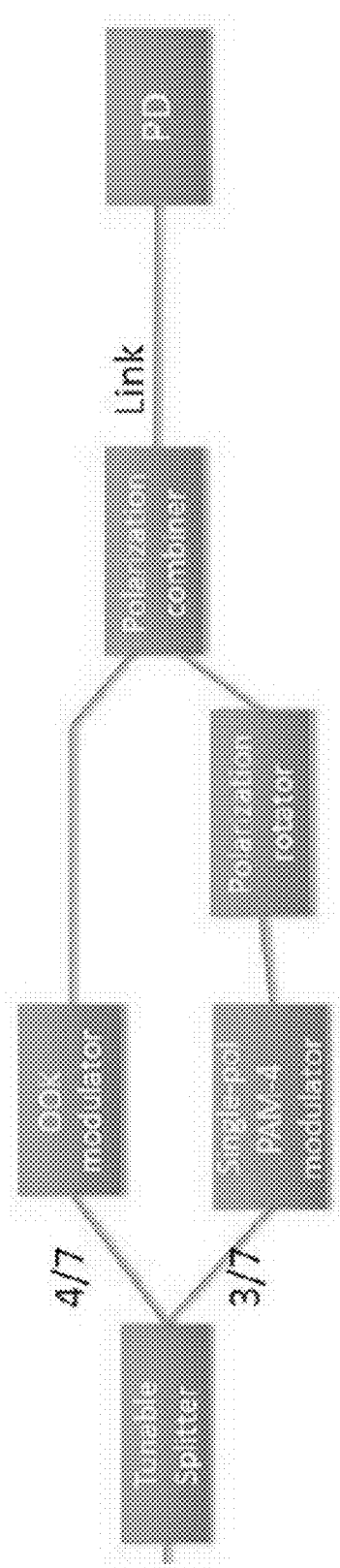
FIG. 3 shows a shows a schematic of an illustrative structure for generating multi-level modulation including PAM-8 or PAM-N according to the present disclosure.

Of further advantage, structures according to the present disclosure may generate PAM-8 or PAM-N formats. One such illustrative implementation is shown schematically in FIG. 3. As shown therein, the structure includes a tunable splitter at an input to a MZI structure and a polarization combiner positioned at the output to the MZI. An OOK modulator is positioned within one arm of the MZI while a single-pol PAM-4 modulator followed by a polarization rotator is positioned in the other arm.

The tunable power splitter splits input light such that $4/7$ is directed to the upper arm while $3/7$ is directed to the lower arm. The lower arm includes a single polarization, PAM-4 generator followed by a polarization rotator. The output of the polarization rotator is combined with an OOK signal generated in the upper arm through the effect of the polarization combiner.

Advantageously, and as can be readily appreciated by those skilled in the art, the structures, methods, and systems constructed therefrom according to the present disclosure may advantageously be constructed using discrete or integrated optical structures. The polarization rotator, combiner, and tunable splitter may be fabricated on a single photonic ship with negligible cost increase(s). By using both polarizations to combine different optical power(s) signals with different amplitudes may be combined without insertion loss penalties. By using a tunable splitter, the input light may be split to produce different amplitude levels without introducing extra insertion loss(es). Finally, output links may be single or multi-mode fibers or waveguide structures.

Figure 4:
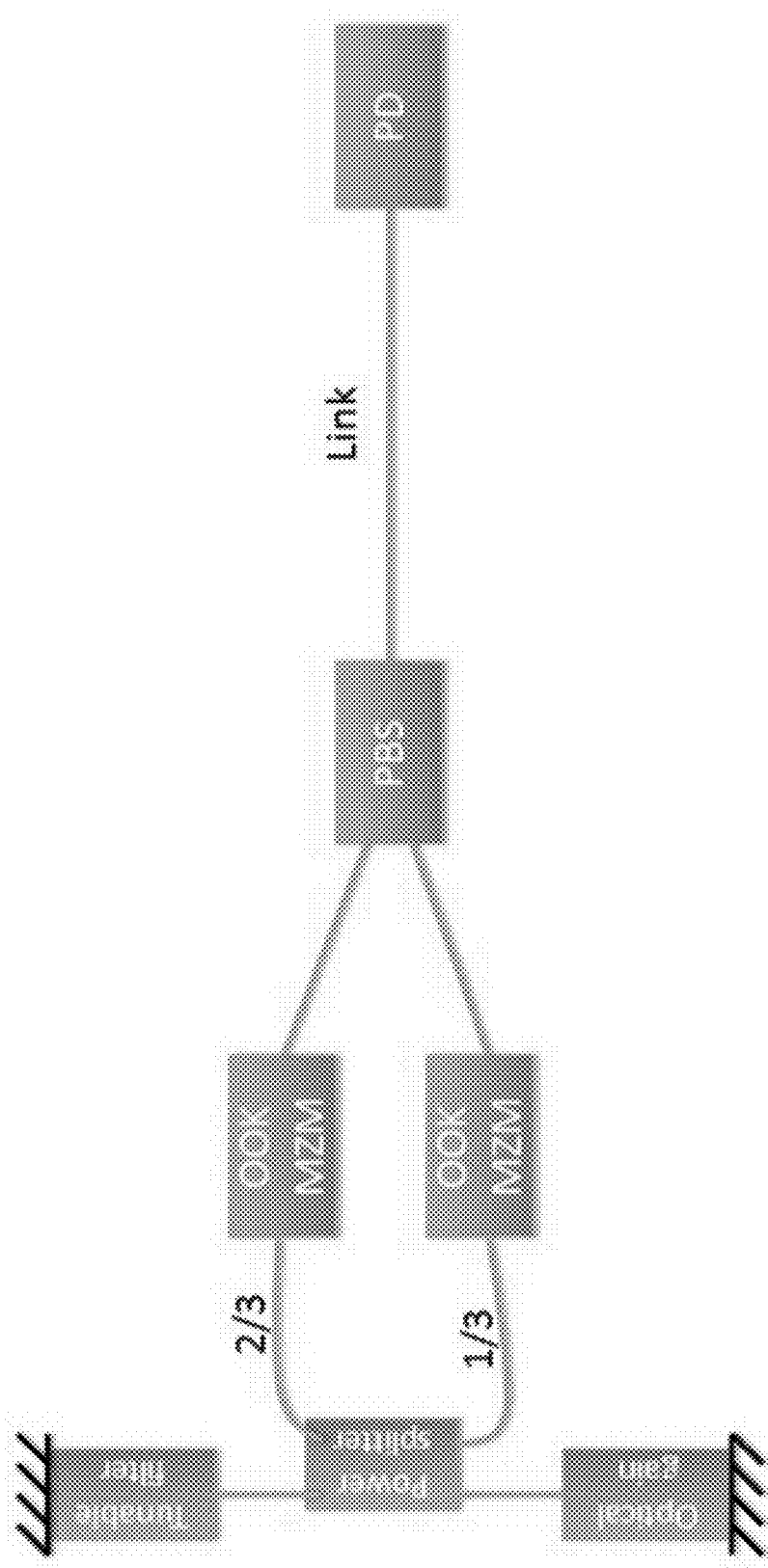
FIG. 4 shows a schematic of an illustrative structure for generating a PAM-4 modulation format wherein the structure includes an integrated laser according to the present disclosure.

Turning now to FIG. 4, there is shown a structure according to the present disclosure having an integrated laser. As shown therein Optical gain and Tunable filter structures are both reflective and interconnected to a power splitter. In the configuration shown, the adjustable power splitter may include a bidirectional power tap positioned within the laser cavity formed by the filter and optical gain structures. When the power top is tunable, it provides tunable power splitting.

As depicted schematically in FIG. 4, two outputs of the power splitter are directed to an MZM arm including OOK modulator, the outputs of which are combined by a polarization beam splitter (PBS) which outputs the combined beams. As depicted in the figure, the power returning from the tunable filter is lower than the power returning from the optical gain. Accordingly, with such a power distribution it is desirable to tap and direct the lower power to the bottom arm ($1/3$ power for PAM-4) and direct the higher power ($2/3$ power for PAM-4) to the top arm.

At this point, those skilled in the art will readily appreciate that while the methods, techniques and structures according to the present disclosure have been described with respect to particular implementations and/or embodiments, those skilled in the art will recognize that the disclosure is not so limited. More specifically and as generally described, alternative laser structures than those shown may be employed in structures containing same. Additionally, any modulator blocks depicted may advantageously be replaced/substituted by other modulation format generating modulators such as duo-binary (DB), quadrature phase shift keying (QPSK), etc. Accordingly, the scope of the disclosure should only be limited by the claims appended hereto.

The invention claimed is:

1. An optical modulator comprising:
   a Mach-Zehnder interferometer (MZI) structure including a tunable splitter arranged to split input light into two modulator arms of the MZI;
   a polarization combiner arranged to combine light from the two modulator arms into an output signal, wherein the two modulator arms connect the tunable splitter to the polarization combiner;
   an on-off keying (OOK) modulator positioned in a first arm of the two modulator arms; and
   a single-polarization, four-level, pulse-amplitude (PAM-4) modulator and a polarization rotator positioned in a second arm of the two modulator arms, wherein the tunable splitter is configured such that $4/7$ of the input light is directed into the first arm and $3/7$ of the input light is directed into the second arm for modulating the input light according to eight-level pulse-amplitude modulation (PAM-8) format.

2. The MZI optical modulator of claim 1, wherein the OOK modulator comprises a Mach Zehnder interferometer.

3. The MZI optical modulator of claim 1, wherein the OOK modulator comprises a electro-absorption modulator or ring modulator.

* * * * *